(No Model.) 2 Sheets—Sheet 1.

M. W. & C. C. CORY.
WOODWORKING MACHINE.

No. 513,964. Patented Jan. 30, 1894.

Witnesses:
J. M. Witherow
G. T. Myers

Inventors,
Moses W. Cory &
Christopher C. Cory,
By Hopkins & Atkins
Attorneys

THE NATIONAL LITHOGRAPHING COMPANY,
WASHINGTON, D. C.

(No Model.) 2 Sheets—Sheet 2.

M. W. & C. C. CORY.
WOODWORKING MACHINE.

No. 513,964. Patented Jan. 30, 1894.

Witnesses:
J. M. Witherow
G. T. Myers

Inventors,
Moses W. Cory &
Christopher C. Cory
By Hopkins & Atkins
Attorneys

THE NATIONAL LITHOGRAPHING COMPANY,
WASHINGTON, D. C.

UNITED STATES PATENT OFFICE.

MOSES W. CORY AND CHRISTOPHER C. CORY, OF DURANT, MISSISSIPPI.

WOODWORKING-MACHINE.

SPECIFICATION forming part of Letters Patent No. 513,964, dated January 30, 1894.

Application filed July 6, 1892. Serial No. 439,156. (No model.)

*To all whom it may concern:*

Be it known that we, MOSES W. CORY and CHRISTOPHER C. CORY, of Durant, county of Holmes, State of Mississippi, have invented certain new and useful Improvements in Woodworking-Machines, of which the following is a specification, reference being had to the accompanying drawings.

The object of our invention is to produce a machine whereby blocks of wood adapted to be used as doweling pins, may be made speedily and perfectly, and it consists in the construction and the arrangement of the parts, hereinafter specified and specifically described in the appended claims.

Figure 1:
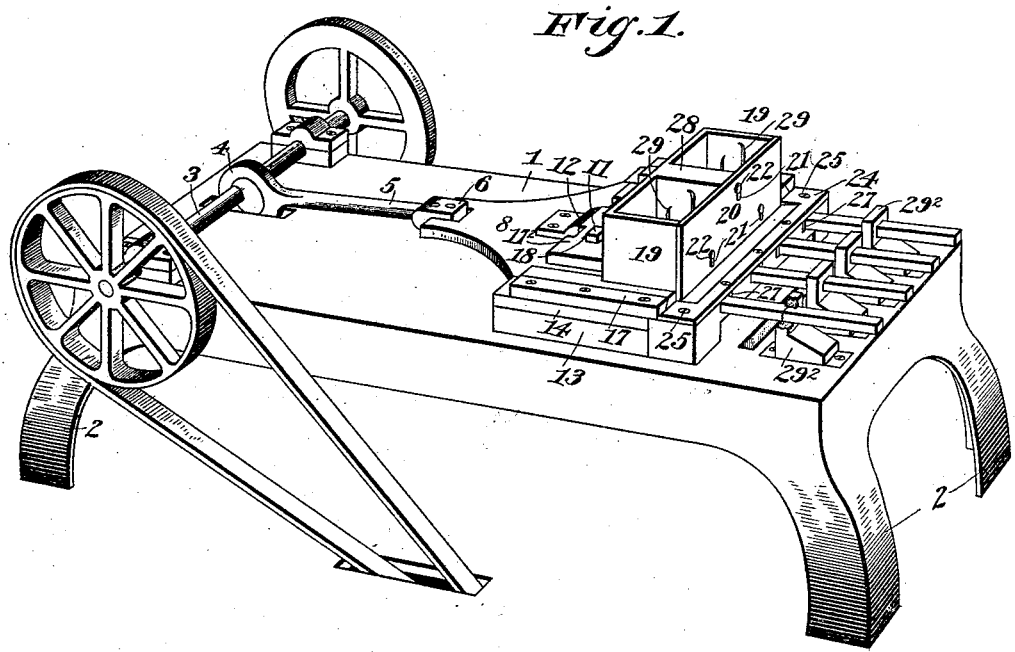
Figure 2:
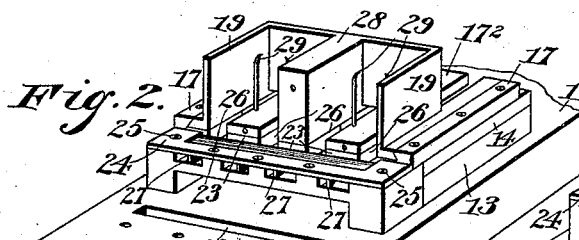
Figure 3:
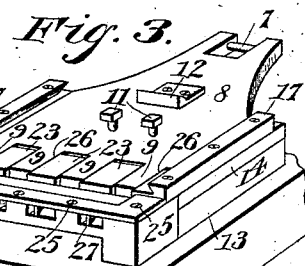
Figure 4:
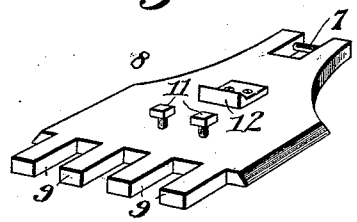
Figure 5:
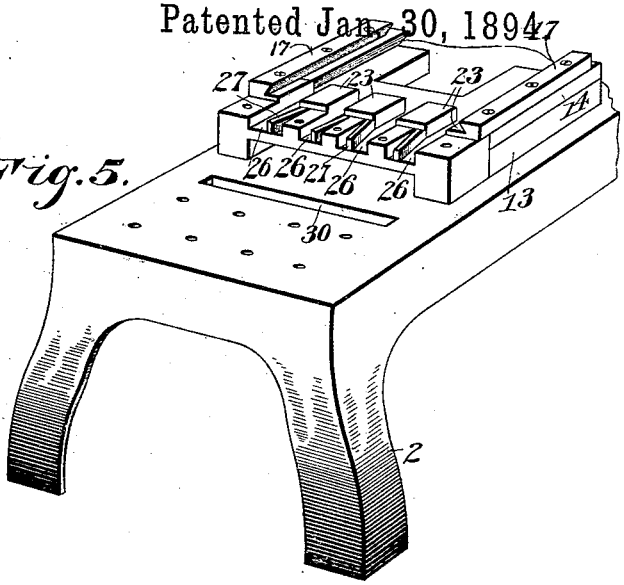
Figure 6:
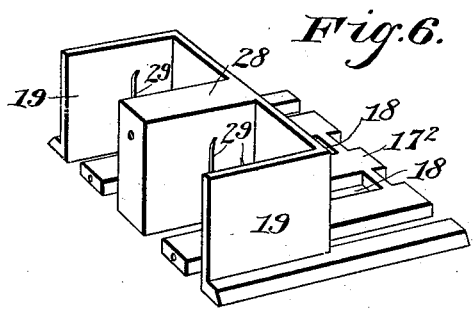
Figure 7:
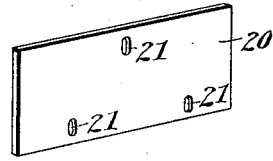
Figure 8:
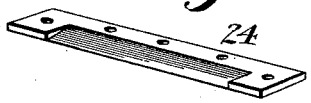
Figure 9:
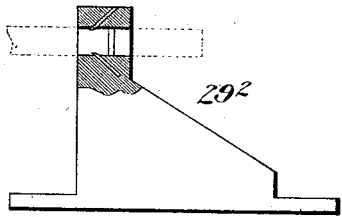

In the accompanying drawings:—Figure 1, is a perspective view of our complete machine, showing the driving plate in the forward part of its throw. Fig. 2, is a similar view with the forming pieces detached, and the front part of the box removed. Fig. 3, is a view similar to that of Fig. 2, with the feed box removed. Fig. 4, is a view of the driving plate detached. Fig. 5, is a view of the frame of the machine with all the movable parts detached, and with the forming plates removed. Fig. 6, is a view of the feed box detached; Fig. 7, a view of the front of the feed box removed, and Fig. 8, a similar view of the knife detached. Fig. 9, is a side elevation partly in section of one of the formers detached.

Referring to the figures on the drawings:— 1 indicates the bed-plate of our machine, which is suitably supported on legs 2.

3, indicates a shaft provided on opposite ends with driving and weighted pulleys, and provided in its middle with a crank 4, to which is fastened a pitman 5, that carries on its opposite end a box 6, that is fitted to a wrist pin 7, in the tail of a driving plate 8. The driving plate is beveled on its opposite sides and carries on its forward end driving pins 9. It is also provided with bolts 11, therein and with a box driving piece 12.

13, indicates side pieces upon the frame, which may be made separately or integrally therewith, and 14, indicates ways or tracks surmounting the side pieces, and fitted to the beveled side of the driving plate, so that the driving plate under the force imparted through the driving shaft may reciprocate readily backward and forward in the frame. Upon top of the driving ways 14 is carried another similar set of driving ways 17, within which reciprocates in like manner as the driving frame a feed box frame $17^2$ which is provided with longitudinal slots 18, and carries on its upper part suitable feed boxes 19.

20, indicates the front plate of the feed box which is provided with vertical slots 21, by which through bolts 22, it may be movably secured to the face of the feed box. The bolts 11 in the driving plate pass up through the slots 18 in the feed box plate, so as to allow the driving plate to travel longitudinally a little in advance of the motion of the feed box plate.

In Fig. 3, of the drawings the driving plate is illustrated as in position in its ways on the frame, in which the top of the plate is flush with the sides of the ways in which it travels.

23, indicates separating partitions, between the driving points, projecting upwardly from the frame and whose surfaces are flush with the top of the frame. It will, therefore, appear from a consideration of Fig. 3, that when the feed box plate is mounted upon its ways on top of the driving plate, it may reciprocate freely backward and forward over the top of the driving plate and the surrounding parts without interfering in any way with the motion of the driving plate.

24, indicates a knife fastened by bolts 25, on the forward part of the frame in close juxtaposition to the separating partitions, and in front of the driving points.

26, indicates channels, or grooves between the sides of the frame, and the dividing partitions, through which or into which the driving points are thrust by the reciprocation of the driving plate. 27, indicates springs in the outer ends of these channels, which guide the wood cut and thrust into it, firmly.

The feed box may be divided into different compartments by any number of partitions, but since each compartment is adapted to serve two driving points, and four driving points are illustrated in the drawings, there is but one partition 28. The number of driving points may be indefinitely increased and the number of partitions may also be increased correspondingly.

In order to adapt each compartment of the feed box to accommodate two of the driving points, we provide a spring partition 29 in each one of the compartments, which may be made of wire or other suitable material, and is adapted to hold a block of wood vertically in position over the grooves 26.

$29^2$, indicates formers, we will call them, or boxes provided with knives into which the piece of wood split from the main body is forced by the reciprocation of the driving points clear through, shaving the pin completely, and forming a doweling pin ready for use; also depositing the shavings into the receptacle 30, in front of them, from which they fall into the bottom of the frame, or on the floor and may be readily removed.

The operation of our machine, is as follows: Blocks of wood of suitable dimensions prepared before hand, are fitted between the sides of the feed box compartment and the springs therein, so that they are held in the vertical position. Then by the reciprocation of the driving plate, when the driving points are retracted out of the grooves or channels 26, the blocks of wood fall in ahead of the driving points, and are by their return movement forced ahead of them against the blade of the knife and split off from the main body or block. The continued pressure upon the split off portions by the driving point, forces them against the springs 27 which guide them with perfect nicety into the formers through which they are forced partially, and are left therein until by the repeated operation of the machine the next pin strikes against the end of the pin which has preceded it, and forces it through the former, and inserts itself in its place. The front plate of the feed box is made vertically movable, in order that it may rise and fall in accordance with the form or the contour of the knife, and may clean it every time of any shavings which may be deposited by the cleavage of the wood. In this manner the waste is completely separated from the finished article, and none of it is allowed to accumulate around it or upon it.

What we claim is—

1. The combination with a frame provided with grooves and a driving shaft, of a driving plate operatively connected with the driving shaft, and provided with driving points adapted to reciprocate through the grooves in the frame, substantially as set forth.

2. The combination with a frame provided with grooves and the driving shaft, of a driving plate and points thereon, a feed box surmounting the driving plate and traveling in the frame, and connecting mechanism between the driving plate and the feed box, whereby the same are operated by the same driving force substantially as set forth.

3. The combination with a frame provided with grooves, a driving plate, suitable driving mechanism, driving points upon the plate, and formers in the line of the driving point in front of the grooves, substantially as and for the purpose specified.

4. The combination with a frame provided with grooves, a driving plate, suitable driving mechanism, driving points upon the plate, a feed box surmounting the driving plate and a vertically movable horizontally disposed knife upon the frame surmounting the grooves, a movable face plate upon the feed box for clearing the knife after each operation of the machine, substantially as and for the purpose specified.

5. The combination with a frame provided with grooves, a driving plate provided with points, suitable driving mechanism, a feed box divided into different compartments, and provided with spring partitions for holding blocks of wood over the grooves in a vertical position, substantially as and for the purpose specified.

6. The combination with a frame provided with grooves, a driving plate, suitable driving mechanism, driving points upon the plate, an independently mounted feed box, said feed box being loosely connected with the driving plate, whereby the motion of the driving plate is imparted to the feed box a little later or a little earlier than the driving plate, substantially as and for the purpose specified.

In testimony of all which we have hereunto subscribed our names.

MOSES W. CORY.
CHRISTOPHER C. CORY.

Witnesses:
C. POWERS,
J. W. MORGAN.